(12) United States Patent
Eilers et al.

(10) Patent No.: US 7,795,317 B2
(45) Date of Patent: Sep. 14, 2010

(54) PROCESS TO PREPARE A FISCHER-TROPSCH SYNTHESIS PRODUCT

(75) Inventors: Jacobus Eilers, Amsterdam (NL); Robert Schouwenaar, Amsterdam (NL)

(73) Assignee: Shell Oil Company, Houston, TX (US)

( * ) Notice: Subject to any disclaimer, the term of this patent is extended or adjusted under 35 U.S.C. 154(b) by 796 days.

(21) Appl. No.: 11/682,351

(22) Filed: Mar. 6, 2007

(65) Prior Publication Data
US 2007/0213414 A1    Sep. 13, 2007

(30) Foreign Application Priority Data
Mar. 7, 2006    (NG) ............... 36/2006
Jul. 14, 2006    (EP) ............... 06117261

(51) Int. Cl.
*C07C 27/00*    (2006.01)
(52) U.S. Cl. ............... 518/705; 518/700; 518/703; 518/704; 518/715
(58) Field of Classification Search ............... 518/700, 518/703, 704, 705, 715
See application file for complete search history.

(56) References Cited
U.S. PATENT DOCUMENTS

| | | | | |
|---|---|---|---|---|
| 3,000,627 A | | 9/1961 | Foote, Jr. ............... | 269/112 |
| 2001/0051662 A1* | | 12/2001 | Arcuri et al. ............... | 518/704 |
| 2002/0032244 A1* | | 3/2002 | Benham et al. ............... | 518/715 |

FOREIGN PATENT DOCUMENTS

| | | |
|---|---|---|
| EP | 297111 | 11/1988 |
| EP | 522744 | 1/1993 |
| EP | 532118 | 3/1993 |
| EP | 774103 | 5/1997 |
| EP | 776959 | 6/1997 |
| GB | 2183672 | 6/1987 |
| WO | 9306041 | 4/1993 |
| WO | 9603345 | 2/1996 |
| WO | 9639354 | 12/1996 |
| WO | 9722547 | 6/1997 |

(Continued)

OTHER PUBLICATIONS

Shell Gasification Process in the Oil and Gas Journal Sep. 6, 1971, pp. 85-90.

*Primary Examiner*—Jafar Parsa

(57) ABSTRACT

The invention provides a process to prepare a Fischer-Tropsch synthesis product from a gaseous mixture of hydrocarbons comprising methane, ethane and optional higher carbon number hydrocarbons comprising the steps of:
(a) pre-reforming the hydrocarbon mixture adiabatically,
(b) heating the gaseous mixture obtained in step (a) to a temperature greater than 650° C.,
(c) performing a non-catalyzed partial oxidation by contacting the heated mixture of step (b) yielding a reactor effluent having a temperature of between 1100 and 1500° C.,
(d) performing a Fischer-Tropsch synthesis using the hydrogen- and carbon monoxide-containing gas as obtained in step (c) as feedstock and
(e) wherein from the synthesis product obtained in step (d) a relatively light stream is separated and wherein a first part of the light stream is recycled to step (a) to be subjected to pre-reforming and wherein a second part of the light stream is recycled to the burner of step (c) to be subjected to partial oxidation and wherein the temperature in step (a) is controlled by the adjusting the amount of light stream that is recycled to step (a).

11 Claims, 3 Drawing Sheets

FOREIGN PATENT DOCUMENTS

| | | |
|---|---|---|
| WO | 2000014179 | 3/2000 |
| WO | 2003000627 | 1/2003 |
| WO | WO03051769 | 6/2003 |
| WO | 2004092060 | 10/2004 |
| WO | 2004096952 | 11/2004 |
| WO | 2005000736 | 1/2005 |
| WO | 2005015105 | 2/2005 |
| WO | 2006097440 | 9/2006 |

* cited by examiner

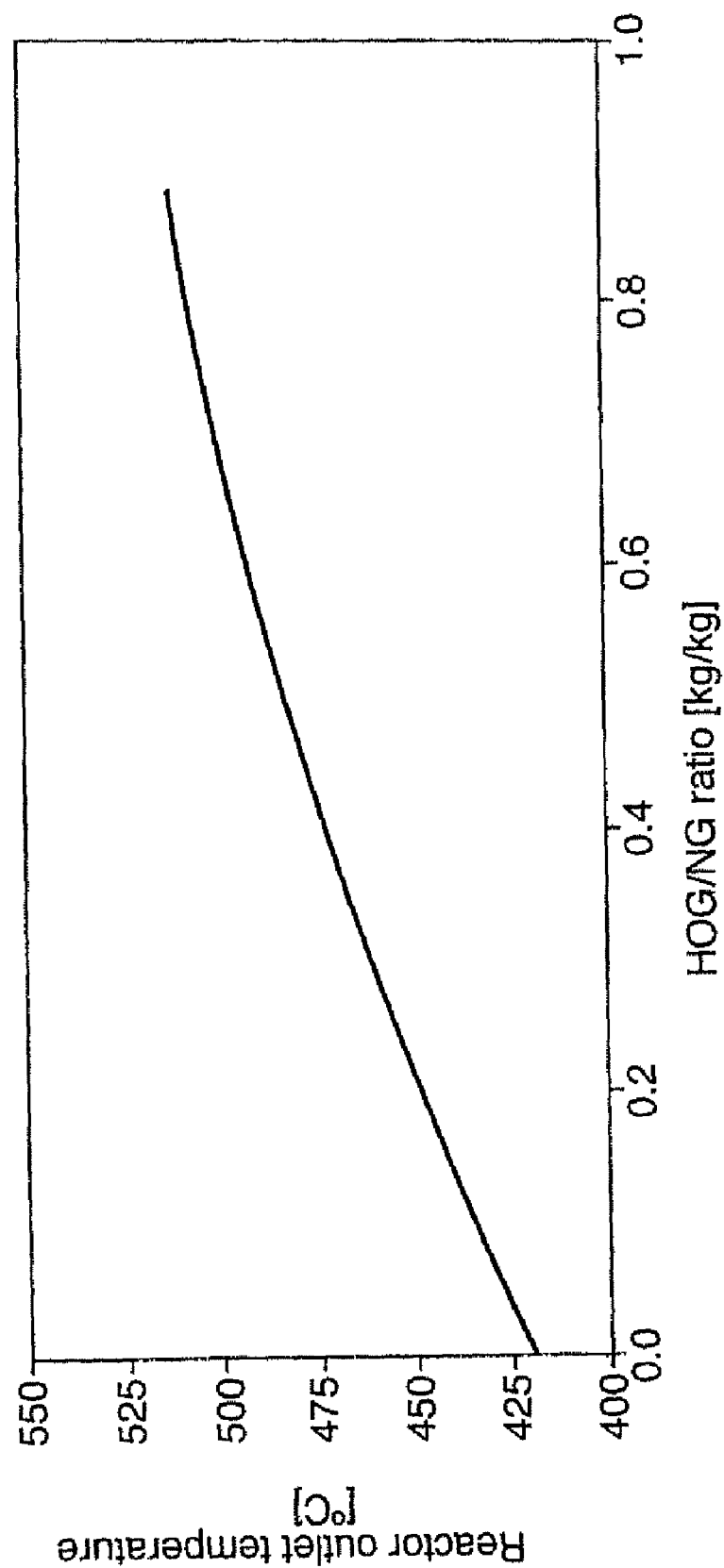

PROCESS TO PREPARE A FISCHER-TROPSCH SYNTHESIS PRODUCT

This application claims the benefit of Nigerian Patent Application No. 36/2006 filed Mar. 7, 2006 and European Patent Application No. 06117261.5 filed Jul. 14, 2006, both of which are incorporated herein by reference.

FIELD OF INVENTION

The invention relates to a process to prepare a Fischer-Tropsch synthesis product from a gaseous mixture of hydrocarbons comprising methane, ethane and propane by partial oxidation.

BACKGROUND OF THE INVENTION

GB-A-2183672 discloses a process to prepare a Fischer-Tropsch synthesis product starting from natural gas. In this process carbon dioxide is removed from the syngas as prepared in a reformer step and recycled to be used in said reformer step.

WO-A-9603345 describes a process to prepare a mixture of carbon monoxide and hydrogen by partial oxidation of natural gas in a co-annular burner using 99.5% pure oxygen and optionally carbon dioxide as moderator gas and in the absence of a catalyst. The temperature of the natural gas feedstock is between 150 and 250° C. in one example and between 280 and 320° C. in another example. The reactor temperature in the examples is between 1250 and 1400° C.

A disadvantage of the above process is that the consumption of oxygen is high.

WO-A-03/000627 describes a process to prepare a Fischer-Tropsch synthesis product from a gaseous mixture of hydrocarbons comprising methane, ethane and higher carbon number hydrocarbons. The process steps comprise a reforming step performed on the hydrocarbon mixture in the presence of a reforming catalyst, wherein the heat for performing this reaction is supplied by indirect heat exchange with a hot gas. The hot gas is the effluent of a partial oxidation of the effluent of the reforming step and a $CO_2$ depleted off-gas of a Fischer-Tropsch process as performed further downstream of these processes. A disadvantage of such a heat-exchange step is that it requires a complicated reforming reactor.

WO-A-2004/096952 describes a process to prepare a Fischer-Tropsch synthesis product from natural gas by passing a mixture of Fischer-Tropsch off-gas and natural gas over an adiabatically operated pre-reformer reactor. The effluent is subsequently used as feed in an auto-thermal reformer (ATR) reactor. The synthesis gas as obtained is used as feed to a Fischer-Tropsch step. The Fischer-Tropsch off-gas may also be added to the feed of the ATR reactor. In order to avoid decomposition of the hydrocarbons in the Fischer-Tropsch off-gas it is preferred to avoid heating this stream to temperatures above 420° C. prior to combining this stream with the feed of the ATR reactor. According to this publication it is preferred to add Fischer-Tropsch off-gas containing hydrocarbons other than methane to the feed of the pre-reformer reactor in order to avoid carbon deposition in the ATR reactor.

The present process involves an improved process to prepare a Fischer-Tropsch product wherein the consumption of oxygen is reduced.

SUMMARY OF THE INVENTION

The following process achieves the above-described objective. Process to prepare a Fischer-Tropsch synthesis product from a gaseous mixture of hydrocarbons comprising methane, ethane and optional higher carbon number hydrocarbons by performing the following steps (a) pre-reforming the hydrocarbon mixture adiabatically in the presence of a reforming catalyst to convert ethane, and the optional higher carbon number hydrocarbons to methane, carbon dioxide and hydrogen, (b) heating the gaseous mixture obtained in step (a) to a temperature greater than 650° C., (c) performing a non-catalyzed partial oxidation by contacting the heated mixture of step (b) with a source of oxygen in a reactor burner yielding a reactor effluent having a temperature of between 1100 and 1500° C., (d) performing a Fischer-Tropsch synthesis using the hydrogen- and carbon monoxide-containing gas as obtained in step (c) as feedstock and (e) wherein the synthesis product obtained in step (d) is separated into a relatively light stream and a relatively heavy stream, wherein the relatively heavy stream comprises the Fischer-Tropsch synthesis product and the relatively light stream comprises unconverted synthesis gas, inerts, carbon dioxide and $C_1$-$C_3$ hydrocarbons and wherein a first part of the light stream is recycled to step (a) to be subjected to pre-reforming and wherein a second part of the light stream is recycled to the reactor burner of step (c) to be subjected to partial oxidation and wherein the temperature in step (a) is controlled by the adjusting the amount of light stream that is recycled to step (a).

BRIEF DESCRIPTION OF THE DRAWINGS

FIG. 3 is a graph of HOG/NG ratio versus reactor outlet temperature for the process of the present invention.

DETAILED DESCRIPTION OF THE INVENTION

Figure 1:
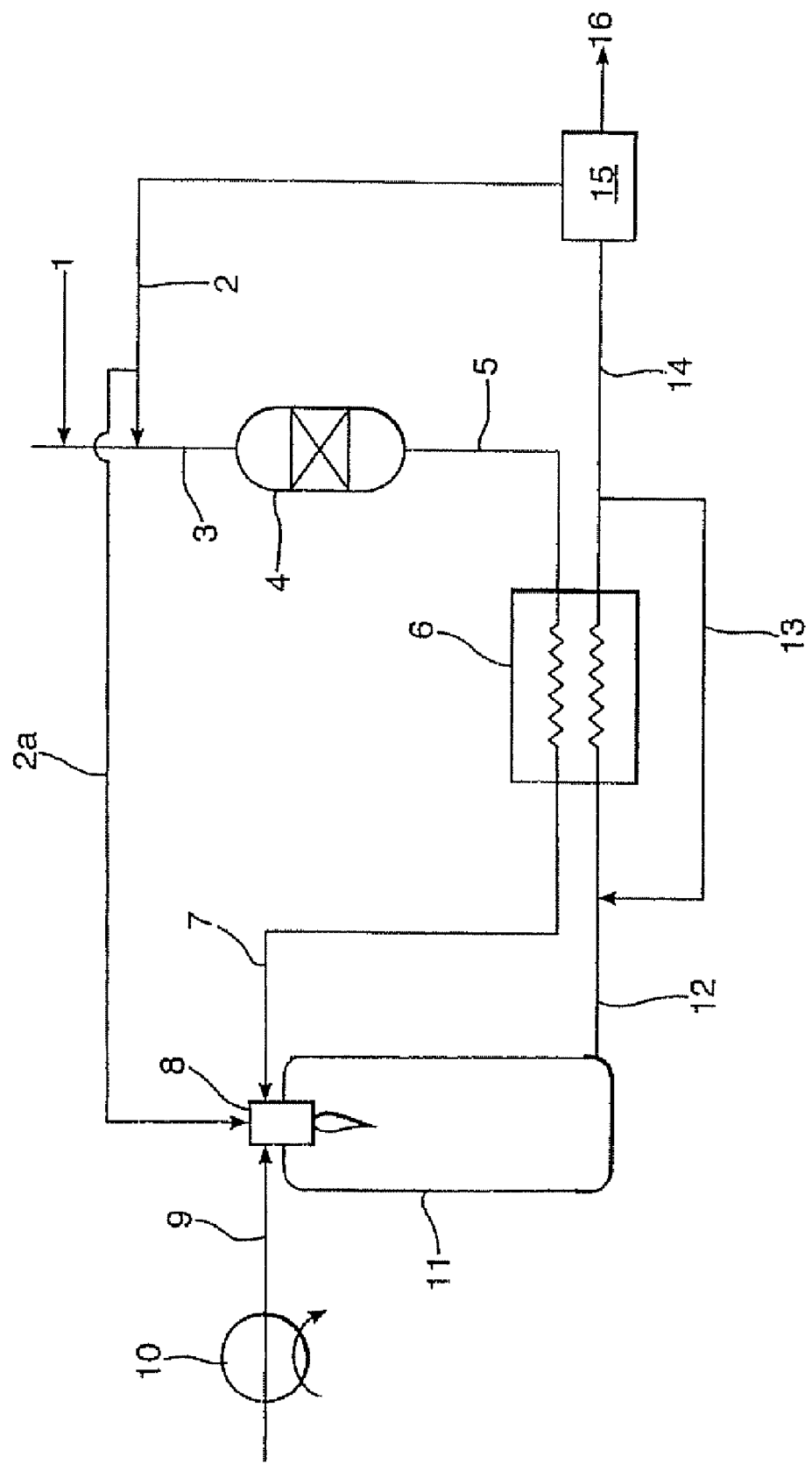
FIG. 1 is a schematic illustration of the process of the present invention.

Applicants found that the composition of the light stream is such that it reacts in an exothermal manner in the adiabatic reformer of step (a). By adjusting the amount of light stream recycled to step (a) the temperature can be controlled, e.g. by reducing this amount when the temperature needs to be reduced and increasing this amount when the temperature needs to be increased. The recycling of light stream thus reduces the need for pre-heating the gaseous feedstock to step (a). Applicants further found that another part of the light stream can be recycled directly to step (c) and avoid carbon deposition by feeding this stream directly to the reactor burner and by performing a non-catalyzed partial oxidation in step (c). Applicants further found that the volume of oxygen as required in step (c) is reduced when the partial oxidation is performed with a pre-heated feed as claimed. In addition applicants found that in some embodiments the formation of carbon dioxide is reduced. Less formation of carbon dioxide is advantageous because it increases the carbon efficiency of the processes which use the mixture of carbon monoxide and hydrogen as feedstock. The pre-reforming step has been found essential in order to avoid cracking of the ethane and higher carbon number hydrocarbons at these elevated temperatures. Recycling of the light stream is advantageous because it enhances the carbon efficiency of the process starting from the gaseous feed to the end Fischer-Tropsch synthesis product.

The gaseous mixture of methane, ethane and optionally hydrocarbons having more than 2 carbon atoms can be obtained from various sources such as natural gas, refinery gas, associated gas or coal bed methane and the like. The gaseous mixture suitably comprises mainly, i.e. more than 90 v/v %, especially more than 94%, $C_{1-4}$ hydrocarbons, especially comprises at least 60 v/v percent methane, preferably at least 75 volume percent, more preferably at least 90 volume percent. Preferably natural gas or associated gas is used.

Preferably any sulphur in the gaseous feedstock is removed prior to performing step (a) to levels of below 10 ppm, preferably below 0.1 ppm. At high-sulphur feed levels the removal of sulphur is suitably performed by contacting the natural gas with a liquid mixture which contains a physical and a chemical absorbent. In such a process the gas mixture is treated at super-atmospheric pressure in two steps consecutively with two different liquid mixtures which contain a physical absorbent and a chemical absorbent. In the first step, $H_2S$ is selectively removed with respect to $CO_2$, and in the second step, the remaining acid gases are virtually completely removed. An example of a suitable process is the so-called sulfolane extraction process. In addition to such removal or at low-sulphur feed levels small amounts of sulphur may also be removed by passing the gaseous feedstock through a bed of a suitable absorbent, for example zinc oxide, to absorb any hydrogen sulphide present. Often the absorbent is preceded by a hydrogenation reactor to convert organic sulphur compounds to hydrogen sulphide.

Step (a) may be performed by well known pre-reforming processes. Pre-reforming is a well-known technique and has been applied for many years in for example the manufacture of so-called city gas. Suitably the pre-reforming step is performed as a low temperature adiabatic steam reforming process. The gaseous feed to step (a) is preferably mixed with a small amount of steam and preheated to a temperature suitably in the range 350-700° C., preferably between 350 and 530° C. and passed over a low temperature steam reforming catalyst having preferably a steam reforming activity at temperatures of below 650° C., more preferably below 550° C. The pressure at which step (a) is employed is preferably between 20 and 100 bars preferably between 40 and 70 bars. Preferably the pressure is about in the same range as the pressure at which step (c) is performed. The steam to carbon (as hydrocarbon and CO) molar ratio is preferably below 1 and more preferably between 0.1 and 1.

Reforming catalyst in step (a) is a suitable reforming catalyst. Suitable reforming catalysts for the low temperature steam pre-reforming step (a) are catalyst comprising an oxidic support material, suitably alumina, and a metals of the group consisting of Pt, Ni, Ru, Ir, Pd and Co. Examples of suitable catalysts are nickel on alumina catalyst as for example the commercially available pre-reforming catalysts from Johnson Matthey, Haldor Topsoe, BASF and Sued Chemie or the ruthenium on alumina catalyst as the commercially available catalyst from Osaka Gas Engineering.

Step (a) is performed adiabatically. Thus the gaseous feedstock and steam are heated to the desired inlet temperature and passed through a bed of the catalyst. Higher hydrocarbons having 2 or more carbon atoms will react with steam to give carbon oxides and hydrogen. At the same time methanation of the carbon oxides with the hydrogen takes place to form methane. The net result is that the higher hydrocarbons are converted to methane with the formation of some hydrogen and carbon oxides. Some endothermic reforming of methane may also take place, but since the equilibrium at such low temperatures lies well in favour of the formation of methane, the amount of such methane reforming is small so that the product from this stage is a methane-rich gas. The heat required for the reforming of higher hydrocarbons is provided by heat from the exothermic methanation of carbon oxides (formed by the steam reforming of methane and higher hydrocarbons) and/or from the sensible heat of the feedstock and steam fed to the catalyst bed. The exit temperature will therefore be determined by the temperature and composition of the feedstock/steam mixture and may be above or below the inlet temperature. The conditions should be selected such that the exit temperature is lower than the limit set by the de-activation of the catalyst. While some reformer catalysts commonly used are deactivated at temperatures above about 550° C., other catalysts that may be employed can tolerate temperatures up to about 700° C. Preferably the outlet temperature is between 350 and 530° C.

Preferably the temperature in step (a) is controlled by the adjusting the amount of light stream that is recycled to step (a). It has been found that the composition of the light stream is such that it reacts in an exothermal manner in step (a). Preferably this composition of the light stream comprises between 5 and 30 mol % carbon monoxide and between 5 and 30 mol % hydrogen. By adjusting the amount of light stream recycled to step (a) the temperature can be controlled, e.g. by reducing this amount when the temperature needs to be reduced and increasing this amount when the temperature needs to be increased. The recycling of light stream thus reduces the need for pre-heating the gaseous feedstock to step (a). Preferably the content of light stream in the total feed to step (a) is above 5 mol % and more preferably between 10 and 50 mol %. It is found that by performing the process within this range a more optimized control of the temperature in step (a) is achieved.

In step (b) the pre-reformed gaseous mixture obtained in step (a) is increased in temperature to above 650° C., more preferably to above 700° C. and more preferably to between 750 and 900° C. Preferably heating may be effected by indirect heat exchange with hot gasses in for example a fired heater. It is obvious that in case the effluent of step (a) has the required temperature that heating in step (b) will be nothing more than maintaining the temperature of the gas above the minimum level according to the process of the invention.

In another preferred embodiment heating is effected by indirect heat exchange between the effluent of step (c) and the pre-reformed gaseous mixture obtained in step (a). This indirect heat exchange may be effected in for example a shell-tube heat exchanger, in a plate-fin heat exchanger or in a fluidized bed type heat-exchanger. A fluidized bed type heater-exchanger is preferred in a situation wherein the effluent of the partial oxidation has a temperature of above 1000° C. By using a fluidized bed heat-exchanger the hot gas is quenched by the high solids loading of the fluidized bed, acting as a moving intermediate between effluent and feed. In case other types of heat exchanger apparatuses are used it is preferred to reduce the effluent of step (c) in temperature to below 1000° C., more preferably to between 850 and 950° C., before using said gas in said heat exchanger. The temperature is suitably reduced by quenching, for example with water or with part of the synthesis gas as prepared by the process of the invention, which gas has a lower temperature, preferably below 300° C. Alternatively the temperature can be reduced by indirect heat exchange against boiling water, as for example in a waste heat boiler, as for example described in WO-A-2005015105, U.S. Pat. No. 4,245,696 and EP-A-774103. Combinations of the foresaid methods may also be applied to reduce the temperature. A further possible method for reducing the temperature is by cooling only part of the effluent of step (c), in for example the above referred to waste heat boiler, and combining the non-cooled effluent of step (c) and the cooled effluent of step (c) to obtain a gas mixture for use in step (b). By controlling the ratio between the effluent which is cooled and which bypasses the cooling step the temperature of the gas mixture for use in step (b) can be controlled.

The partial oxidation of step (c) may be performed according to well-known principles as for example described for the Shell Gasification Process in the Oil and Gas Journal, Sep. 6, 1971, pp 85-90. Publications describing examples of partial oxidation processes are EP-A-291111, WO-A-9722547, WO-A-9639354 and WO-A-9603345. In step (c) according to the process of the present invention the heated pre-reformed feed as obtained in step (b) is contacted with an oxygen containing gas under partial oxidation conditions. The partial oxidation of step (c) is performed in the absence of a catalyst as is the case in the above referred to Shell Gasification Process. Thus no catalytic conversion takes place for conversion of hydrocarbons to carbon monoxide and hydrogen after the partial oxidation has taken place. Such processes are also referred to as non-catalyzed partial oxidation processes.

The oxygen containing gas may be air (containing about 21 percent of oxygen) and preferably oxygen enriched air, suitably containing up to 100 percent of oxygen, preferably containing at least 60 volume percent oxygen, more preferably at least 80 volume percent, more preferably at least 98 volume percent of oxygen. Oxygen enriched air may be produced via cryogenic techniques, or alternatively by a membrane based process, e.g. the process as described in WO 93/06041.

Contacting the feed with the oxygen containing gas in step (c) is preferably performed in a burner placed at the top of a vertically oriented reactor vessel. The temperature of the oxygen as supplied to the burner is preferably greater than 200° C. The upper limit of this temperature is preferably 500° C. The gaseous product of the non-catalyzed partial oxidation reaction in step (c) has a temperature of between 1100 and 1500° C., preferably between 1200 and 1400° C. as measured at the reactor outlet and an $H_2/CO$ molar ratio of from 1.5 up to 2.6, preferably from 1.6 up to 2.2.

If the effluent of step (c) is not used in step (b) as a hot gas for heat exchange against the pre-reformed gas as described above the temperature of the effluent of step (c) is preferably reduced in temperature in a so-called waste heat boiler as for example described in WO-A-2005015105, U.S. Pat. No. 4,245,696 and EP-A-774103. In such a waste heat boiler water evaporates and steam and even super heated steam is prepared. Such steam may find attractive use for power generation and the like. Part of said steam may advantageously be combined with the feed of step (a). The mixture of carbon monoxide and hydrogen as cooled in the waste heat boiler will preferably have a temperature of between 400 and 500° C. Preferably this stream is used to increase the temperature by means of indirect heat exchange of especially the natural gas feed upstream the sulphur removal step to a temperature of between 300 and 450° C. The mixture of carbon monoxide and hydrogen is preferably cooled to a temperature of below the dewpoint to achieve maximal heat recovery after which the fluid can be fed to a water scrubber in which advantageously soot is removed.

In step (d) a Fischer-Tropsch synthesis is performed using the hydrogen- and carbon monoxide-containing gas as obtained in step (c) as feedstock and wherein the synthesis product is prepared. Step (d) is suitably performed in one or more steps wherein the mixture of hydrogen and carbon monoxide are at least partly converted into liquid hydrocarbons in the presence of a Fischer Tropsch type catalyst. This catalyst preferably comprises at least one metal (compound) selected from group 8 of the Periodic Table. Preferred catalytic metals are iron and cobalt, especially cobalt. It is preferred to produce a very heavy product in step (d). This results in a relatively low amount of light hydrocarbons, e.g. $C_1$-$C_4$ hydrocarbons by-product, resulting in a higher carbon efficiency. Large amounts of heavy products may be produced by catalysts which are known in the literature, e.g. vanadium or manganese promoted cobalt catalysts, under suitable conditions, i.e. relatively low temperatures and relatively low $H_2/CO$ ratios. Any hydrocarbons produced in step (d) boiling above the middle distillate boiling range may be converted into middle distillates by means of hydrocracking/hydroisomerization. Such a step will also result in the hydrogenation of the product as well as in (partial) isomerization of the product.

The Fischer Tropsch synthesis is, as indicated above, preferably carried out with a catalyst producing large amounts of unbranched paraffinic hydrocarbons boiling above the middle distillate range. Relatively small amounts of oxygen containing compounds are produced. The process is suitably carried out at a temperature of 150 to 300° C., preferably 190 to 260° C., and a pressure from 20 to 100 bar, preferably from 30 to 70 bar.

In the hydrocracking/hydroisomerization process preferably at least the fraction boiling above the middle distillate boiling range is hydrocracked and hydroisomerized into middle distillate fractions having a lower carbon number and having a higher content of branched paraffins than the feed to said hydrocracker. Preferably all $C_5^+$, especially all $C_{10}^+$ hydrocarbons are hydrocracked/hydroisomerized in view of the improved pour point of the middle distillates, suitably gas oil, obtained in such a process. Suitable hydrocracking/hydroisomerization processes are described in for example WO-A-200014179, EP-A-532118 and EP-A-776959. In said hydrocracking/hydroisomerization process an off-gas comprising hydrogen and $C_1$-$C_3$ hydrocarbons will be separated from the effluent of the hydrocracking/hydroisomerization step. This off-gas may find use as fuel for the optional fired heater of step (b), as additional feed to step (a) or as additional feed to step (c). In a preferred embodiment, the off-gas is used in step (d), wherein the hydrogen is used in the Fischer-Tropsch synthesis.

The product stream obtained in step (d) is separated into a relatively light stream and a relatively heavy stream. The relatively light stream (off gas) comprises mainly unconverted synthesis gas, inerts, carbon dioxide and the $C_1$-$C_3$ hydrocarbons, preferably the $C_1$-$C_4$ hydrocarbons. According to the present invention, a first part of the light stream is recycled to step (a) to be subjected to pre-reforming and a second part of the light stream is recycled directly to step (c) to be subjected to partial oxidation. A small bleed stream is not recycled to step (a) and step (c) in order to avoid a build-up of inerts in the recirculating gas mixture. An example of an effective bleed stream is by using part of the light stream as fuel for the fired heater of step (b) as described above for a preferred embodiment of the present invention.

FIG. 1 shows an embodiment of the process according to the present invention. Natural gas (1) is mixed with part of the gaseous by-products stream (2) from a Fischer-Tropsch synthesis step (15) to form feed (3). Feed (3) and steam is fed to a pre-reformer reactor (4) and a pre-reformed effluent (5) is obtained. This effluent (5) is increased in temperature in heat exchanger (6) against the effluent (12) of a partial oxidation reactor (11). Heated pre-reformed mixture (7) together with oxygen (9) is fed to a burner (8) of a partial oxidation reactor (11). Oxygen (9) is preferably heated in heat exchanger (10). To cool the effluent before use in heat exchanger (6) effluent

(12) is cooled by quenching with part of the cooled product gas (13). Other methods for cooling as described above may also be suitably applied. The resultant mixture of hydrogen and carbon monoxide (14) is used in Fischer-Tropsch synthesis reactor (15) to obtain a paraffinic waxy product (16). From the paraffinic waxy product (16) a gaseous by-product stream (2) is recovered and recycled to reactor (4) and to burner (8) as (2a).

Figure 2:
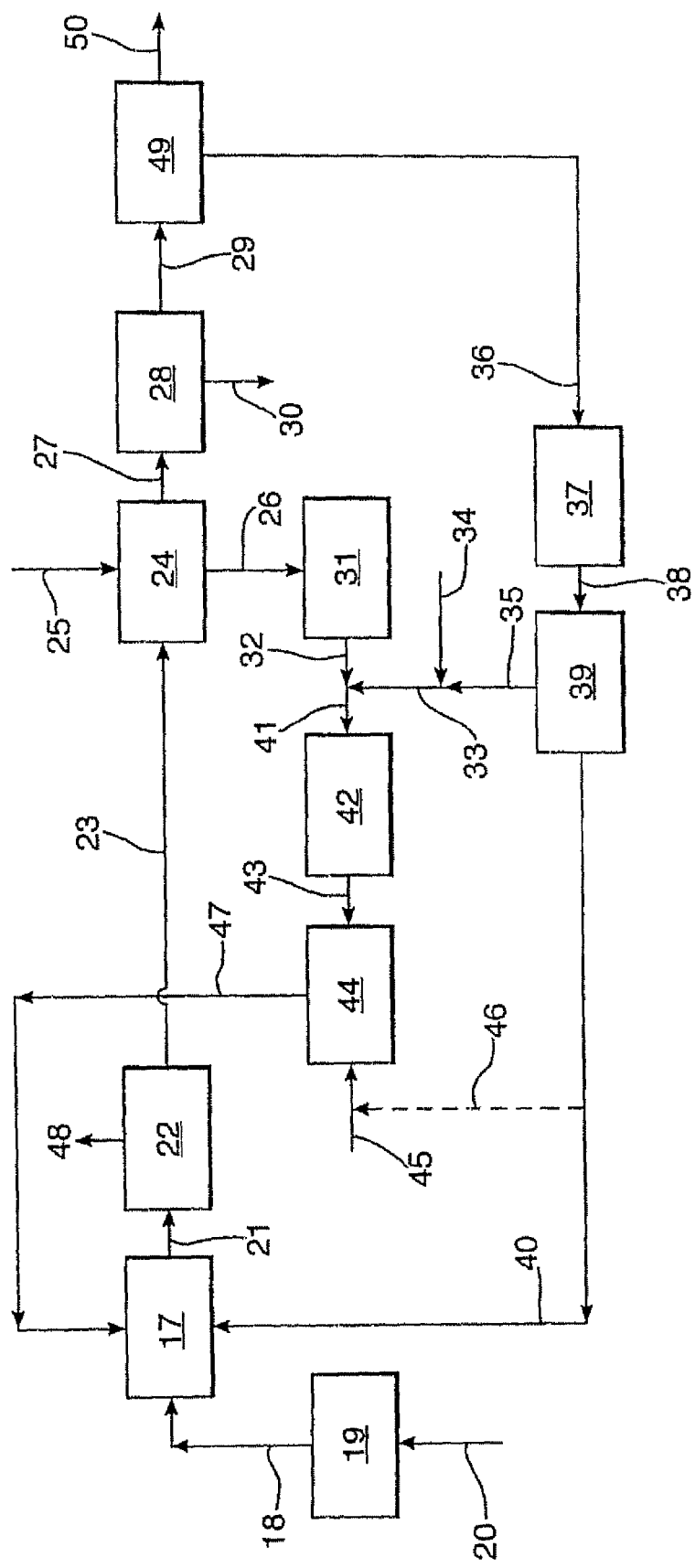
FIG. 2 is a schematic illustration of a second preferred embodiment of the process of the present invention.

FIG. 2 shows another preferred embodiment of the present invention. A partial oxidation reactor (17) is fed with pre-heated oxygen (18) and a pre-reformed and pre-heated mixture (47) to obtain a product gas (21). The pre-heated oxygen (18) is obtained by heating oxygen (20) in a oxygen preheater (19). The product gas (21), comprising hydrogen and carbon monoxide is reduced in temperature in a heat exchanger (22) against water to obtain steam (48), more preferably super heated steam. Heat exchanger (22) is also referred to as a waste heat boiler as for example described in the earlier referred to WO-A-2005015105, U.S. Pat. No. 4,245,696 and EP-A-774103. The conduits for passage of the product gas (21) in heat exchanger (22) are preferably made of a nickel based metal alloy to avoid metal dusting. An example of a suitable metal alloy is Alloy 693 as obtainable from Special Metals Corporation, USA. The partially cooled product gas (23) having a temperature of preferably between 420 and 450° C. is used in heat exchanger (24) to increase the temperature of natural gas (25) to a heated natural gas stream (26) having a temperature of about 380° C. The product gas (27) having a temperature of below the dewpoint or slightly above is fed to a scrubber (28) to remove any residual soot formed in partial oxidation reactor (17) and recover a cleaned product gas (29) and waste water (30). The product gas (29) is provided to a Fischer-Tropsch synthesis step (49) yielding a Fischer-Tropsch synthesis product (50) and a light stream (36). Sulphur is removed from the pre-heated natural gas (26) in sulphur removal unit (31). The sulphur poor natural gas (32) is mixed with stream (33) which includes high-pressure steam (34) to obtain a mixture (41), which in turn is used as feed to pre-reformer reactor (42). The effluent (43) of pre-reformer reactor (42) having a temperature of suitably between 370 and 480° C. is increased in temperature in feed pre-heater (44). Pre-heater (44) is suitably a fired heater, which is a furnace, which is fuelled with a suitable combustion gas and air mixture (45). Suitable combustion gasses are fuel gas, natural gas or the light stream as obtained from the Fischer-Tropsch synthesis step (36) directly or after pressurization as stream (46).

FIG. 2 also shows light stream (36) as obtained from a Fischer-Tropsch synthesis step (49). This gaseous stream (36) is increased in pressure in compressor (37) to a pressure level of the partial oxidation reactor (17) and the pre-reformer (42). The pressurized stream (38) is increased in temperature in pre-heater (39). The pre-heated stream is directly fed to the burner(s) of the partial oxidation reactor (17) via stream (40) and to pre-reformer reactor (42) via stream (35) which is mixed with steam (34) to form stream (33). Optionally a remainder of this light stream may be used as fuel (46) in Furnace (44).

The invention shall be illustrated with the following non-limiting examples. The examples are calculated mass balances using models describing the reality as best as possible.

EXAMPLE 1

To a natural gas (NG) having the composition as in Table 1 a certain amount of light stream as obtained from a Fischer-Tropsch synthesis step (HOG) having the composition as in Table 1 is mixed. The outlet temperature of the effluent leaving a catalyst bed of reforming catalyst is calculated using a thermodynamic model. In these calculations a feed temperature of 350° C. is used as input. In FIG. 3 it is seen that the temperature of the catalyst bed increases by increasing the content of HOG in the feed. This illustrates that by adjusting the content of HOG to the feed of the pre-reformer the temperature in said step can be controlled.

TABLE 1

|  |  | NG | HOG |
|---|---|---|---|
| CO | mol % | — | 27.64 |
| $H_2$ | mol % | — | 17.98 |
| $CO_2$ | mol % | 4.55 | 21.44 |
| $CH_4$ | mol % | 87.30 | 23.13 |
| $C_2+$ | mol % | 6.83 | 6.23 |
| $N_2/Ar$ | mol % | 1.32 | 3.58 |

The Invention claim:

1. A process to prepare a Fischer-Tropsch synthesis product from a gaseous mixture of hydrocarbons comprising methane, ethane and optional higher carbon number hydrocarbons comprising the steps of:
   (a) pre-reforming the hydrocarbon mixture adiabatically in the presence of a reforming catalyst to convert ethane, and the optional higher carbon number hydrocarbons to form a gaseous mixture of methane, carbon dioxide and hydrogen;
   (b) heating the gaseous mixture obtained in step (a) to a temperature greater than 650° C.;
   (c) performing a non-catalyzed partial oxidation by contacting the heated mixture of step (b) with a source of oxygen in a reactor burner yielding a reactor effluent having a temperature of between 1100 and 1500° C.; and
   (d) performing a Fischer-Tropsch synthesis using the hydrogen- and carbon monoxide-containing gas as obtained in step (c) as feedstock;
   (e) wherein the synthesis product obtained in step (d) is separated into a relatively light stream and a relatively heavy stream, wherein the relatively heavy stream comprises the Fischer-Tropsch synthesis product and the relatively light stream comprises unconverted synthesis gas, inerts, carbon dioxide and $C_1$-$C_3$ hydrocarbons and wherein a first part of the light stream is recycled to step (a) to be subjected to pre-reforming and wherein a second part of the light stream is recycled to the burner of step (c) to be subjected to partial oxidation and wherein the temperature in step (a) is controlled by the adjusting the amount of light stream that is recycled to step (a).

2. A process according to claim 1, wherein the amount of light stream as recycled to step (a) is such that the temperature of the gas as obtained in step (a) is between 350 and 530° C.

3. A process according to claim 1, wherein the steam to carbon (as hydrocarbon and CO) molar ratio of the feed to step (a) is between 0.1 and 1.

4. A process according to claim 1, wherein the gaseous mixture is increased in temperature to between 750 and 900° C. in step (b).

5. A process according to claim 1, wherein heating in step (b) is effected by indirect heat exchange between the effluent of step (c) and the pre-reformed gaseous mixture obtained in step (a).

6. A process according to claim 1, wherein heating in step (b) is effected in a fired heater.

7. A process according to claim 1, wherein step (c) is performed by contacting the heated mixture of step (b) with the oxygen containing gas in a burner placed at the top of a vertically oriented reactor vessel yielding a reactor effluent having a temperature of between 1200 and 1400° C. and a $H_2/CO$ molar ratio of from 1.6 up to 2.2.

8. A process according to claim 1, wherein the light stream comprises between 5 and 30 mol % carbon monoxide and between 5 and 30 mol % hydrogen.

9. A process according to claim 1, wherein the content of light stream in the total feed to step (a) is between 5 and 50 mol %.

10. A process according to claim 1, wherein the reforming catalyst in step (a) comprises an oxidic support material and a metal selected from the group consisting of Pt, Ni, Ru, Ir, Pd and Co.

11. A process according to claim 1, wherein the relatively heavy stream comprising the Fischer-Tropsch synthesis product as obtained in step (d) is subjected to a hydrocracking step yielding a gas oil product.

* * * * *